United States Patent [19]

Kurihara et al.

[11] Patent Number: 4,947,029
[45] Date of Patent: Aug. 7, 1990

[54] CLEANING DEVICE FOR INFORMATION RECORDING MEDIUM

[75] Inventors: Hideo Kurihara, Tokyo; Kenichi Suzuki; Kazuo Minoura, both of Yokohama; Keiji Ohkoda, Tokyo; Hitoshi Kurihara, Yorii; Yoshihiro Kurasawa, Ogano, all of Japan

[73] Assignees: Canon Kabushiki Kaisha, Tokyo; Canon Denshi Kabushiki Kaisha, Saitama, both of Japan

[21] Appl. No.: 409,993

[22] Filed: Sep. 19, 1989

Related U.S. Application Data

[63] Continuation of Ser. No. 923,034, Oct. 24, 1986, abandoned.

[30] Foreign Application Priority Data

| Nov. 1, 1985 | [JP] | Japan | 60-244189 |
| Nov. 1, 1985 | [JP] | Japan | 60-244190 |
| Nov. 1, 1985 | [JP] | Japan | 60-244191 |
| Nov. 5, 1985 | [JP] | Japan | 60-246286 |
| Nov. 6, 1985 | [JP] | Japan | 60-247127 |
| Nov. 7, 1985 | [JP] | Japan | 60-248122 |
| Jun. 5, 1986 | [JP] | Japan | 60-129175 |

[51] Int. Cl.⁵ .......................... G11B 3/58; A46B 13/02
[52] U.S. Cl. ................................... 235/475; 235/479; 360/72; 15/99; 15/102
[58] Field of Search ........ 235/475, 479, 477, 480–486; 369/72, 73; 15/77, 102, 210 R, 246

[56] References Cited

U.S. PATENT DOCUMENTS

| 3,117,333 | 1/1964 | Murray et al. | |
| 3,237,231 | 3/1966 | Zink. | |
| 3,800,349 | 4/1974 | Green. | |
| 4,006,507 | 2/1977 | Yoshida | 15/246 |
| 4,360,906 | 11/1982 | Shitama | 369/72 |
| 4,547,063 | 10/1985 | Stange | 335/15 |

FOREIGN PATENT DOCUMENTS

46-20190 6/1971 Japan.
49-13635 11/1973 Japan.

*Primary Examiner*—Bruce A. Reynolds
*Assistant Examiner*—Leon K. Fuller
*Attorney, Agent, or Firm*—Fitzpatrick, Cella, Harper & Scinto

[57] ABSTRACT

A cleaning device comprises a cleaning member having a cleaning surface adapted to abut against a recording surface of an information recording medium, apparatus for holding the cleaning member, apparatus for moving the cleaning surface of the cleaning member, and apparatus for moving the hold means relative to the recording surface.

32 Claims, 8 Drawing Sheets

CLEANING DEVICE FOR INFORMATION RECORDING MEDIUM

This application is a continuation of application Ser. No. 923,034, filed Oct. 24, 1986, now abandoned.

BACKGROUND OF THE INVENTION

1. Field of the Invention

The present invention relates to a cleaning device for removing dust and dirt deposited on a recording surface of an information recording medium. Such a device is suitably used to clean a surface of a card-like optical recording medium (hereinafter optical card) or card-like magnetic recording medium (hereinafter magnetic card).

2. Related Background Art

In an apparatus for reading information recorded on a magnetic card such as a cash card or credit card, the magnetic card is inserted in the apparatus and the information is read by a stationary magnetic head while the magnetic..,.card moves. If foreign materials such as dust, fingerprints or oil are deposited on the recording surface of the card, the head is damaged, and reading precision is lowered or the foreign materials enter into the apparatus and causes a failure thereof. Accordingly, in this type of apparatus, it is usual to mount a cleaning device for removing the dirt deposited on the card surface, immediately behind a card insertion slot.

An example of the cleaning device is shown in Japanese Utility Model Publication No. 30902/1978 in which a pair of cleaners which are made of soft material and have projecting areas and recessed areas alternately arranged are mounted in a path of card insertion so that the card is sandwiched by the pair of cleaners.

In this cleaner device, the cleaners for cleaning the card are fixed and the card is cleaned only by top edges of the cleaners. Accordingly, the top edges of the cleaners always contact the card and become dirty, and hence the lifetime of the cleaners is short.

When an object to be cleaned is an information recording medium other than the magnetic card, the same problem arises. In an optical information recording medium such as optical card, the information is recorded at a high density and hence the dirt must be removed efficiently.

SUMMARY OF THE INVENTION

It is an object of the present invention to provide a cleaning device which resolves the problem encountered in the prior art cleaning device, has a long lifetime and cleans effectively.

The above object of the present invention is achieved by a cleaning device comprising a cleaning member having a cleaning surface adapted to abut against a recording surface of an information recording medium, means for holding the cleaning member, means for moving the cleaning surface of the cleaning member and means for moving the hold means relative to the recording surface.

DETAILED DESCRIPTION OF THE PREFERRED EMBODIMENTS

Figure 1:
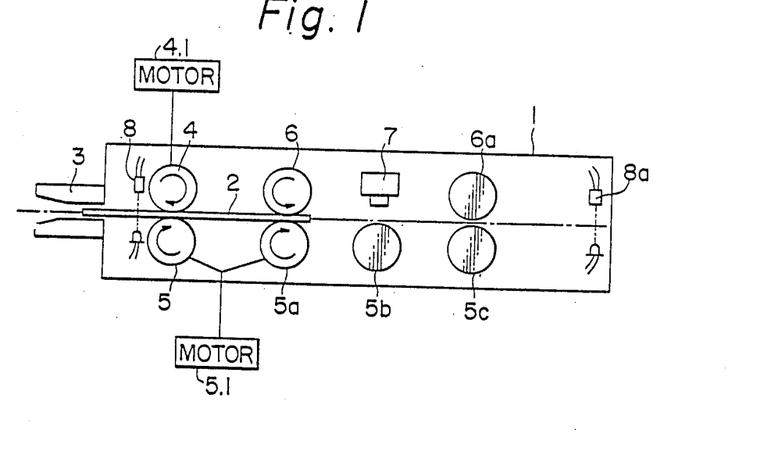
FIG. 1 shows a sectional view of a first embodiment of a cleaning device of the present invention.
Figure 2:
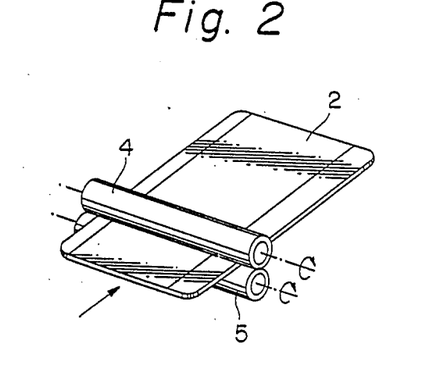
FIG. 2 is a perspective view of a main portion of the device shown in FIG. 1.

FIG. 1 shows a sectional view of a first embodiment of the cleaning device of the present invention. It is applied to an optical card recording and reproducing apparatus. FIG. 2 shows a perspective view of a main portion of the cleaning device of FIG. 1.

In FIGS. 1 and 2, numeral 1 denotes a main body of the recording and reproducing apparatus. An insertion slot 3, through which an optical card 2 which is an information recording medium is inserted, is formed on one side of the main body. Numerals 5, 5a, 5b and 5c denote drive rollers arranged along and under an optical card insertion path. They are rotated in the same direction by a motor 5.1. Numerals 6 and 6a denote follower rollers arranged in pair with and on the drive rollers 5a and 5c, respectively. Numeral 4 denotes a cleaning roller arranged in pair with and on the drive roller 5 which is closest to the insertion slot 3. It is rotated in the same direction as the drive roller 5 by a motor 4.1. Accordingly, the directions of rotation of the drive roller 5 and the cleaning roller 4 at the abutting surfaces thereof are opposite to each other. The cleaning roller 4 is made of a resilient material capable of absorbing dirt such as dust, fingerprints or oil. Numeral 7 denotes an optical head for optically recording information on the optical card 2 and reading information from the optical card 2. Numerals 8 and 8a denote photo-sensors for detecting the presence or absence of the optical card 2 to control the direction of rotation of the drive rollers 5, 5a, 5b and 5c.

In the present embodiment, a cleaning device is constructed by the drive roller 5 and the cleaning roller 4.

In the present embodiment, when the optical card 2 is inserted from the insertion slot 3, the optical card is detected by the photo-sensors 8, the drive rollers 5-5c start to rotate rightward and the cleaning roller 4 also starts to rotate rightward. The spacing between the rollers 4 and 5 is set such that the cleaning roller 4 is pushed toward the optical card 2 on the drive roller 5 by a predetermined force, and the materials of the rollers are selected such that a frictional force between the drive roller 5 and the optical card 2 is larger than a frictional force between the cleaning roller 4 and the optical card 2. Thus, the optical card 2 is fed rightward as the drive roller 5 is rotated. The upper surface (information recording surface) of the optical card 2 contact with the cleaning roller 4 and is moved relative to the surface of the cleaning roller 4 with a large relative velocity. As a result, the dirt deposited on the upper surface of the optical card 2 is wiped off or sprung out toward the insertion slot 3 so that the surface is cleaned.

The optical card 2 thus cleaned by the cleaning device passes through the clearance between the drive roller 5a and the follower roller 6 and reaches above the drive roller 5b, that is, below the optical head 7, where information is recorded or read and then the optical card 2 passes through the clearance between the drive roller 5c and the follower roller 6a. When the optical card 2 is detected by the photo-sensor 8a, the direction of rotation of the drive rollers 5-5c is reversed.

The optical card 2 is then fed reversely along the feed path and ejected out of the insertion slot 3. In this case, the pressure of the cleaning roller 4 on the optical card 2 may be released.

In the present embodiment, the cleaning surface of the cleaning roller 4 runs oppositely to the movement of the optical card 2 at the contact area of the cleaning roller 4 and the optical card 2. Accordingly, relatively large objects such as dust are sprung toward the insertion slot 3 and prevented from entering into the main body 1. In the present embodiment, the direction of rotation of the cleaning roller 4 may be reversed to that described above. In this case, the rotating speed of the cleaning roller 4 at the contact area with the optical card 2 is selected to be different from the rotating speed of the drive roller 5. Thus, excellent and effective cleaning is attained.

In the present embodiment, the cleaning is attained only by the roller. However, if a relatively large object is deposited on the optical card, it may not be completely wiped off by the roller. In such a case, a brush may be arranged in front of the roller, as shown in FIG. 3.

Figure 3:
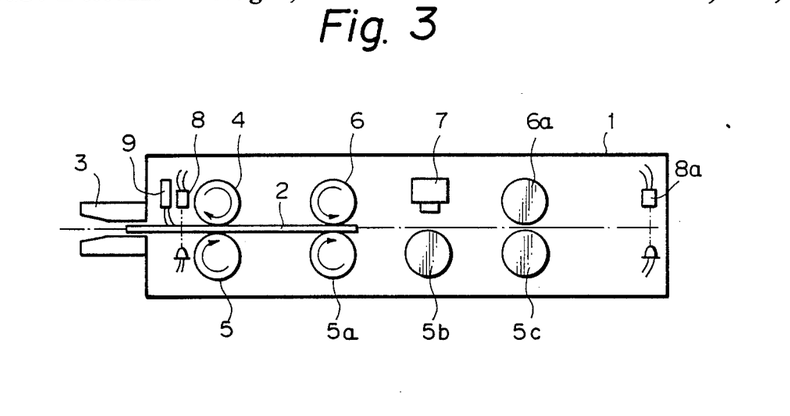
FIG. 3 shows a sectional view of a second embodiment of the cleaning device of the present invention.
Figure 4:
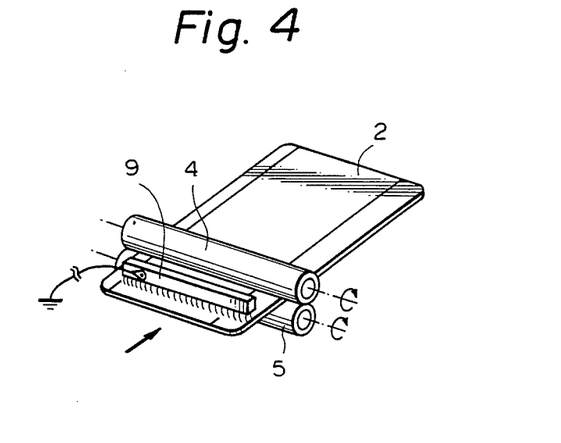
FIG. 4 shows a perspective view of a main portion of the device shown in FIG. 3.

FIG. 3 shows a sectional view of a second embodiment of the cleaning device of the present invention applied to an optical card recording and reproducing apparatus, and FIG. 4 shows a main portion of the device shown in FIG. 3. The elements similar to those shown in FIG. 1 are designated by like numerals and the explanation thereof is omitted.

The present embodiment differs from an first embodiment in that a brush 9 is arranged between the cleaning roller 4 and the insertion slot 3. A relatively large object deposited on the optical card 2 inserted from the insertion slot 3 is removed by the brush 9. The brush 9 is conductive and grounded as shown in FIG. 4 so that it removes static electricity charged on the optical card 2 to prevent the deposition of dust on the optical card 2. The feed-in and feed-out operations of the optical card 2 in the present embodiment are same as those in the first embodiment.

Figure 5:
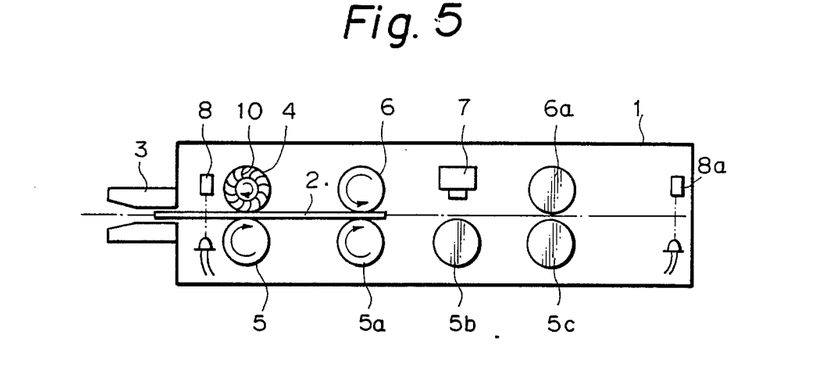
FIG. 5 shows a sectional view of a third embodiment of the cleaning device of the present

The relatively large object may also be removed by a fan as shown in FIG. 5.

Figure 6:
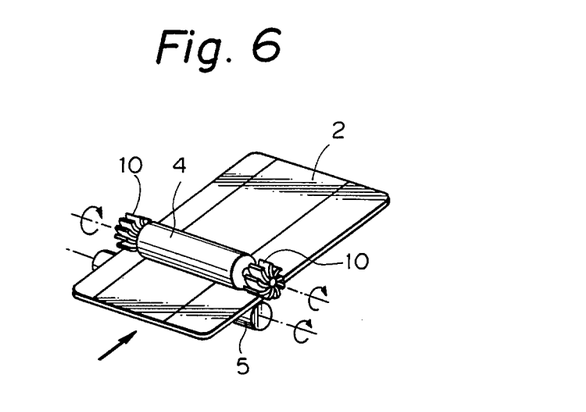
FIG. 6 shows a perspective view of a main portion of the device shown in FIG. 5.

FIG. 5 shows a sectional view of a third embodiment of the cleaning device of the present invention applied to the optical card recording and reproducing apparatus, and FIG. 6 shows a main portion of the device shown in FIG. 5. The similar elements to those shown in FIG. 1 are designated by like numerals and an explanation thereof is omitted.

The present embodiment differs from the first embodiment in that fans 10, which rotate with the cleaning roller 4, are attached to the opposite ends of the roller 4. A relatively large object deposited on the optical card 2 is blown away by an air flow created by the rotation of the fans 10 and removed from the surface of the card. The fans 10 may also be used to dissipate heat. The feed-in and feed-out operations of the optical card 2 in the present embodiment are the same as those in the first embodiment.

In the above embodiments, a rotation axis of the cleaning roller is orthogonal to the feed direction of the card. By inclining the rotation axis from the direction orthogonal to the feed direction, a cleaning device which is particularly effective for an optical card is provided, as described below.

Figure 7:
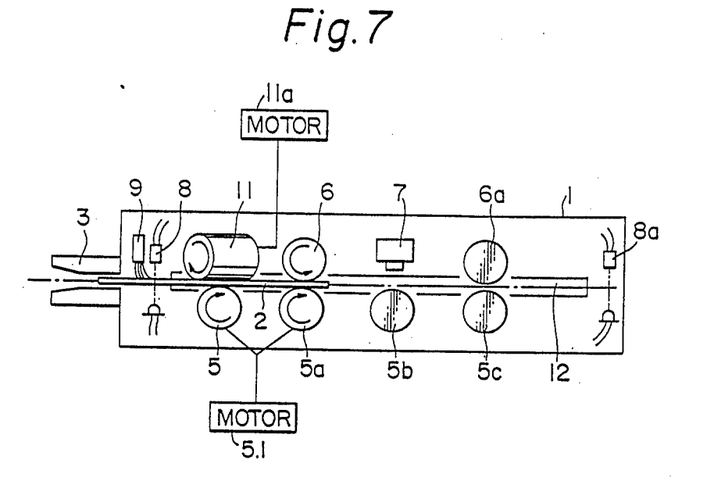
FIG. 7 shows a sectional view of a fourth embodiment of the cleaning device of the present invention.
Figure 8:
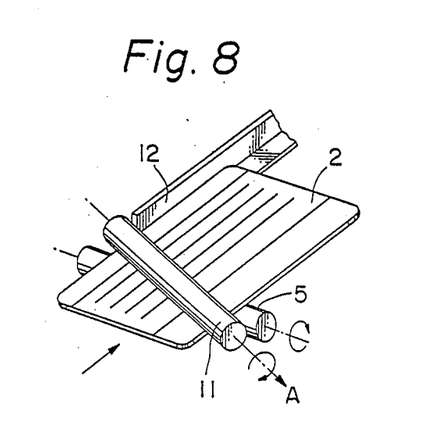
FIG. 8 shows a perspective view of a main portion of the device shown in FIG. 7.

FIG. 7 shows a sectional view of a fourth embodiment of the cleaning device of the present invention applied to the optical card recording and reproducing apparatus, and FIG. 8 shows a perspective view of a main portion of the device shown in FIG. 7. The elements similar those shown in FIGS. 1 and 2 are designated by like numerals and an explanation thereof is omitted.

The present embodiment differs from the first embodiment in that the rotation axis A of the cleaning roller 11 is arranged not to be orthogonal to the feed direction of the optical card 2. The roller is driven by a motor 11a. A track is provided on the recording surface of the optical card 2 parallel to the feed direction. If a scratch is formed on the track parallel to the track, it significantly affects to the recording and reproducing of the information because the scratch may be misrecognized as a track causing a tracking miss, or the scratches are concentrated in one track and they cannot be compensated by error correction. In the present embodiment, since the direction of movement of the roller 11 on the cleaning surface is not parallel to the track, a scratch parallel to the track is not created even if the dust deposited on the roller rubs the recording surface of the optical card.

In the present embodiment, a guide plate 12 is provided along the feed direction of the optical card 2. Since the cleaning roller 11 is arranged such that the right end thereof is closer to the insertion slot 3, the rear portion of the optical card 2 is forced toward the guide plate 12 arranged along the feed path of the optical card 2. Accordingly, the optical card 2 is stably fed along the guide plate 10 without lateral vibration.

In the above embodiments, the cleaning surface of the cleaning roller may be machined, as shown below.

Figure 9:
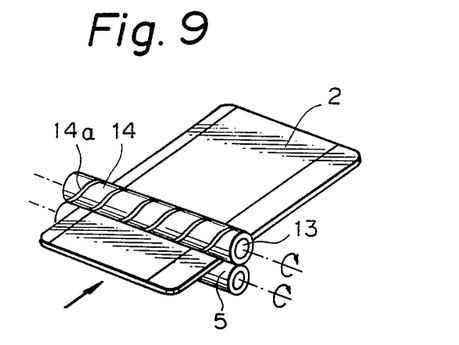
FIG. 9 shows a perspective view of a main portion of a fifth embodiment of the cleaning device of the present invention.

FIG. 9 shows a perspective view of a main portion of a fifth embodiment of the present invention. In the present embodiment, the cleaning roller 4 in the first embodiment is replaced by a cleaning roller 13 having a spiral groove 14a formed on a cleaning surface 14 thereof. Other elements are same as those of FIG. 1. In the present embodiment, the dust deposited on the optical card 2 is moved toward the side of the card along the spiral groove 6a as the roller 13 is rotated, and removed from the card.

Figure 10:
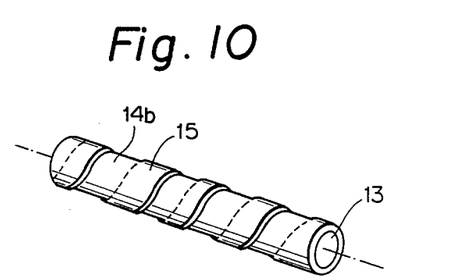
FIG. 10 shows a perspective view of a roller used in the fifth embodiment.
Figure 11:
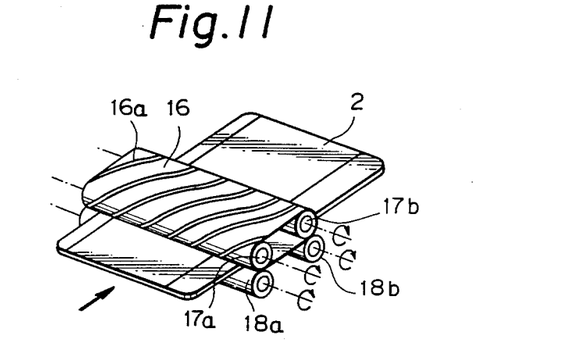
FIG. 11 shows a perspective view of a modification of the fifth embodiment.

The cleaning roller 13 of the present embodiment may be formed by wrapping a plate member 15 around the roller surface with the edges thereof being overlapped to form the spiral groove 14b, as shown in FIG. 10. Instead of the cleaning roller 13, as shown in FIG. 11, a belt-like cleaning member 16 made of a resilient material such as deer skin having a spiral groove 16a formed thereon may be spanned between a pair of spaced rollers 17a and 17b. In this case, drive rollers 18a and 18b are arranged on the opposite side of the optical card 2 at the positions corresponding to the rollers 17a and 17b.

Figure 12:
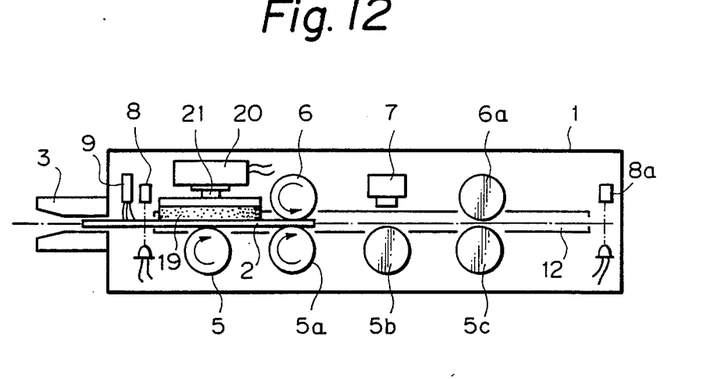
FIG. 12 shows a sectional view of a sixth embodiment of the cleaning device of the present invention.
Figures 13, 14:
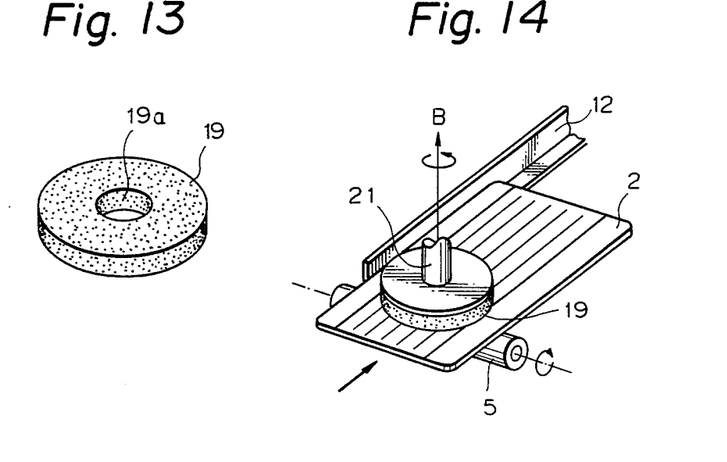
FIG. 13 shows a perspective view of a cleaning member used in the sixth embodiment.
FIG. 14 shows a perspective view of a main portion of the device shown in FIG. 12.

FIG. 12 shows a sectional view of a sixth embodiment of the cleaning device of the present invention applied to the optical card recording and reproducing apparatus, and FIG. 14 shows a perspective view of a main portion of the device shown in FIG. 12. The elements similar to those shown in FIGS. 1, 2 and 7 are designated by like numerals and an explanation thereof is omitted. Numeral 19 denotes a rotatable cleaning member which is located in the feed path of the optical card 2 and has a diameter slightly smaller than the width of the optical card 2. The cleaning member 19 is made of a resilient material for absorbing dust, fingerprints and oil, and has an opening 19a at the center as shown in FIG. 13. As shown in FIG. 14, it is arranged such that a rotation axis B of the cleaning member 19 is normal to the recording surface of the optical card 2. Numeral 20 denotes a drive motor for rotating the cleaning member 19. It is linked to the cleaning member 19 through a shaft 21.

In the present embodiment, when the optical card 2 is fed in, the cleaning member 12 which abuts against the recording surface of the optical card 2 is rotated (leftward) at a high speed to remove the dust deposited on the optical card 2 and wipe off the fingerprints and oil. Because the opening 19a is formed at the center of the cleaning member 19, even if a scratch is formed on the optical card 2 by the dust deposited on the cleaning member 19, it will not be a scratch parallel to the track direction (arrow) which influences the recording and reproducing of the information.

Since the cleaning member 19 cleans the surface of the optical card 2 while it rotates, a force is applied to the optical card 2 toward the guide plate 12 arranged along the feed path of the card. Accordingly, the optical card 2 is stably fed along the guide plate 12 without lateral vibration.

In the above embodiments, the cleaning device is arranged in the feed path of the card in the optical information recording and reproducing apparatus. Alternatively, a separate cleaning device may be provided, as shown below.

Figure 15:
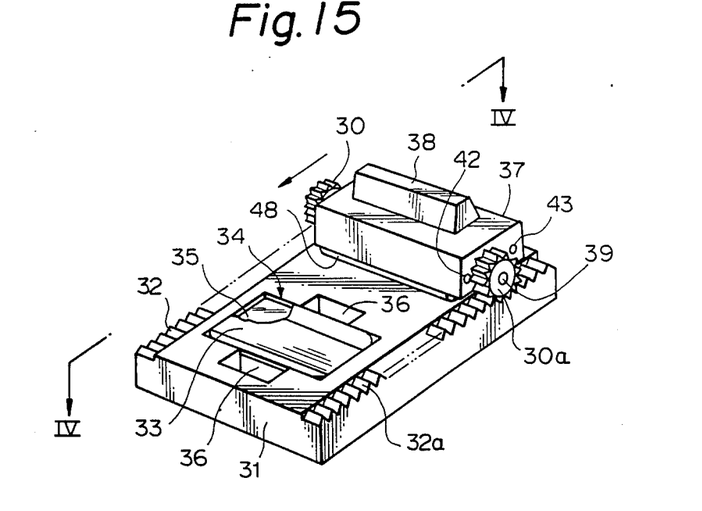
FIG. 15 shows a perspective view of a seventh embodiment of the cleaning device of the present invention.
Figure 16:
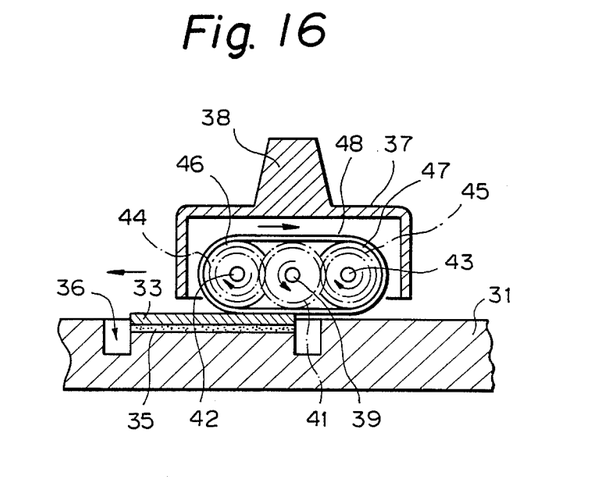
FIG. 16 shows a sectional view of the device shown in FIG. 15.

FIG. 15 shows a perspective view of a seventh embodiment of the cleaning device of the present invention, and FIG. 16 shows a IV—IV sectional view thereof. The present embodiment is also intended to clean the information recording surface of the card-like recording medium such as an optical card or magnetic card.

In FIGS. 15 and 16, numeral 31 denotes a base. Racks 32 and 32a are formed in parallel to each other on the opposite edges of the base. A recess 34 for positioning a card 33 is formed at a center of the upper surface of the base. The recess 34 is slightly less deep than the thickness of the card 33. The bottom of the recess is made of a high friction coefficient material 35 such as rubber to prevent the back side of the card from being scratched and to prevent slip. Numeral 36 denotes a finger hole formed near the recess 34 for use when the card is taken out. Numeral 37 denotes a movable member having a grip 38 at the top thereof for manual operation. A shaft 39 is rotatably attached to the movable member 37 and the opposite ends of the shaft extend externally of the movable member, and pinion gears 40 and 40a which mesh with the racks 32 and 32a are fixed at the ends of the shaft. Gears 41 are attached to the opposite ends of the shaft 39 in the movable member. Shafts 42 and 43 are mounted on the movable member 37 parallel to the shaft 39. Gears 44 and 45 are fixed to those shafts such that the gears 44 and 45 mesh with the gears 41 on the shaft 39. The numbers of teeth of the gears 44 and 45 are equal. Rollers 46 and 47 are fixed at the center of the shafts 42 and 43, and a cleaning belt 48 is spanned across the rollers 46 and 47. The cleaning belt is made of a resilient and soft material such as deer skin.

To clean the card 33, the card 33 is first mounted in the recess 34. Thus, the information recording surface of the card is at a slightly higher level then the upper surface of the base 31. The movable member 37 is moved in the direction of the arrow by an operator so that the gears 41 fixed to the shaft 39 are rotated in the direction of the arrow by the engagement of the racks 32 and 32a and the pinion gears 30 and 30a. As a result, the gears 44 and 45 which mesh with the gears 41 ar rotated in the direction of the arrow, and the shafts 42 and 43 fixed to the gears 44 and 45 and the rollers 46 and 47 fixed to the shafts 42 and 43 rotate in the direction of the arrow. Thus, the cleaning belt 48 is moved in the direction of the arrow, and at the contact area with the card 33, the velocity of the movable member 37 to the base 31 and the velocity of the cleaning belt 48 to the movable member are added and the card 33 is cleaned by the cleaning belt 48 at a very high relative velocity with a high efficiency.

The similar effect is obtained when the direction of movement of the movable member 37 is reversed. The movable member may be reciprocally moved.

In the present embodiment, the cleaning belt 48 is wrapped around the rollers 46 and 47 in a conventional manner and only one surface thereof contacts to the card 33. If the cleaning belt is spanned in a Mebius ring, the cleaning is done by the both surfaces of the belt 48 and the lifetime of the belt 48 is doubled.

Figure 17:
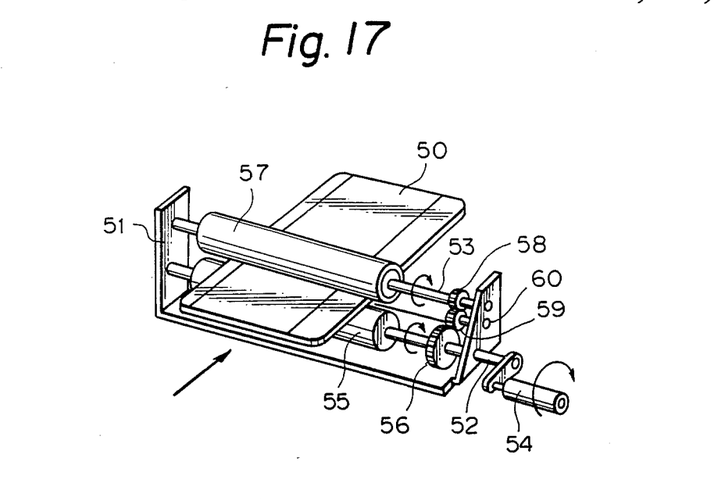
FIG. 17 shows a perspective view of an eighth embodiment of the cleaning device of the present and FIG. 18 shows a sectional view of a ninth embodiment of the cleaning device of the present invention.

FIG. 17 shows a perspective view of an eighth embodiment of the cleaning device of the present invention. Like the seventh embodiment, the present embodiment is intended to clean the information recording surface of the card-like information recording medium.

In FIG. 17, numeral 51 denotes a frame having two shafts 52 and 53 parallel and rotatably attached thereto. A handle 54 is attached to one end of the shaft 52 to permit manual rotation of the shaft. A drive roller 55 and a gear 56 are attached to the shaft 52, and a cleaning roller 57 and a gear 58 are fixed to the shaft 53 at positions corresponding to the drive roller 55 and the gear 56. The drive roller and the cleaning roller may be similar to those used in the first embodiment. An intermediate gear 59 is arranged between the gears 56 and 58, and it is rotatably mounted on a shaft 60 mounted on the frame 51.

To clean the card 50, the handle 54 is manually operated to rotate it in the direction of the arrow. The card 50 is inserted between the drive roller 55 and the cleaning roller 57 in the direction of the arrow. The lower surface of the card 50 is imparted with a frictional force in the direction of the arrow, between the rollers, and the upper surface of the card is imparted with the frictional force of the opposite direction. Because the frictional force with the lower surface is larger than it is in the first embodiment, the card is moved in the direction of the arrow and the upper surface is cleaned by the cleaning roller 57.

The present embodiment is similar to the first embodiment in its construction except that it is manually operated and the card 50 is moved in the particular direction.

Figure 18:
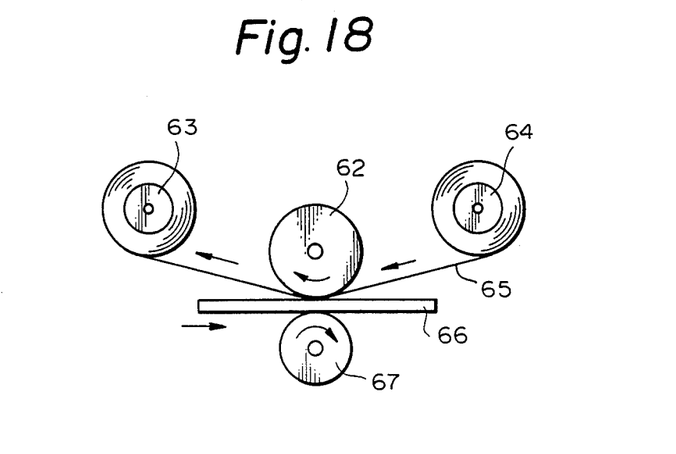

FIG. 18 shows a side view of a ninth embodiment of the cleaning device of the present invention. Like the eighth embodiment, the present embodiment is intended to clean the information recording surface of the card-like information recording medium.

In FIG. 18, numeral 67 denotes a drive roller, numeral 62 denotes a pressure roller mounted above the drive roller, numeral 63 denotes a take-up roller, numeral 64 denotes a supply roller, and numeral 65 denotes a clearing belt. A motor, not shown, is coupled to the take-up roller 63, and the cleaning belt rewound from the supply roller 64 passes through a clearance between the pressure roller 62 and the drive roller 67 and is taken up by the take-up roller 63.

To clean the card 66, the card 66 is inserted between the drive roller 67 and the pressure roller 62 and the cleaning belt 65 in the direction of the arrow. In the present embodiment, because the frictional force between the drive roller 67 and the card 66 is larger than the frictional force between the card and the cleaning belt 65, the card 66 is moved in the direction of the arrow by the drive roller 67 and the upper surface of the card is cleaned by the cleaning belt 65.

In the above embodiments, the automatic drive means by the motor or the manual drive means have been shown. In those embodiments, the automatic drive means may be replaced by the manual drive means and vice versa.

What is claimed is:

1. A cleaning device for cleaning a recording surface of an information recording medium, comprising:
   a cleaning member having a cleaning surface adapted to be abutted against the recording surface;
   hold means for holding said cleaning member;
   drive means for moving the cleaning surface of said cleaning member;
   means for moving said cleaning member relative to the recording surface;
   and a brush abutting against the recording surface, wherein said brush comprises a conductive material and is grounded.

2. A cleaning device according to claim 1 wherein said cleaning member comprises a roller having a cylindrical surface thereof arranged to abut against the recording surface, and wherein said drive means rotates said roller around a rotation axis thereof.

3. A cleaning device according to claim 2 wherein said roller rotation axis is arranged to make an angle relative to a direction orthogonal to the direction of relative movement between the recording surface and said cleaning member.

4. A cleaning device according to claim 1 wherein said cleaning member comprises a disk-shaped member having a rotation axis thereof arranged orthogonal to the recording surface, and wherein said drive means rotates said disk-shaped member around the rotation axis thereof.

5. A cleaning device according to claim 4 wherein said disk-shaped member has an opening at a center thereof.

6. A cleaning device according to claim 1, wherein said means for moving said cleaning member relative to the recording surface includes a rotatable drive roller, and wherein the information recording medium is held between said cleaning member and said drive roller.

7. A cleaning device according to claim 1 wherein said hold means is integral with a main body of an information recording and reproducing apparatus.

8. A cleaning device according to claim 1 wherein said cleaning member is adapted to clean an information recording medium comprising a card-like optical information recording medium.

9. A cleaning device according to claim 1 wherein said brush is positioned on the side of an insertion slot of the device with respect to said cleaning member.

10. A cleaning device for cleaning a recording surface of an information recording medium, comprising:
    a base adapted for mounting the information recording medium thereon;
    a movable member mechanically coupled to said base and movable in a linear direction substantially perpendicular to an information track on the information recording medium;
    a cleaning member held by said movable member and having a cleaning surface adapted to abut against the recording surface of the recording medium; and
    drive means for moving the cleaning surface of said cleaning member as said movable member is moved.

11. A cleaning device according to claim 10 wherein said cleaning member includes a plurality of rollers having a rotation axis arranged parallel to the recording surface and a cleaning belt spanned across said rollers, and wherein said drive means rotates said rollers.

12. A cleaning device according to claim 11 wherein said drive means includes a rack mounted on said base, and a pinion gear coupled to at least one of said rollers and arranged on said movable member to mesh with said rack.

13. A cleaning device according to claim 10 wherein said base is provided with a recess for positioning the information recording medium.

14. A cleaning device according to claim 13 wherein said recess is less deep than the thickness of the information recording medium.

15. A cleaning device according to claim 10 wherein said cleaning member is adapted to clean an information recording medium comprising a card-like optical information recording medium.

16. A cleaning device for cleaning a recording surface of an information recording medium, comprising:
    a cleaning member having a cleaning surface adapted to be abutted against the recording surface, said cleaning member including a pair of parallel arranged rollers and a belt-like member spanned thereacross;
    hold means for holding said cleaning member;
    drive means for moving the cleaning surface of said cleaning member, said drive means rotating said rollers; and
    means for moving said cleaning member relative to the recording surface.

17. A cleaning device according to claim 16 wherein said belt-like member is supplied from one of said rollers and is rewound by the other of said rollers.

18. A cleaning device according to claim 16 wherein said means for moving said cleaning member relative to the recording surface includes a rotatable drive roller, and wherein the information recording medium is held between said cleaning member and said drive roller.

19. A cleaning device according to claim 16 wherein said hold means is integral with a main body of an information recording and reproducing apparatus.

20. A cleaning device according to claim 16 wherein said cleaning member is adapted to clean an information recording medium comprising a card-like optical information recording medium.

21. A cleaning device for cleaning a recording surface of an information recording medium, comprising:
   a cleaning member having a cleaning surface adapted to be abutted against the recording surface;
   cleaning member for holding said cleaning member;
   means for moving said hold means relative to the recording surface; and
   drive means for moving the cleaning surface of said cleaning member in a direction which forms an angle with a longitudinal axis of the information recording medium.

22. A cleaning device according to claim 21 further comprising a brush abutting against the recording surface.

23. A cleaning device according to claim 22 wherein said brush comprises a conductive material and is grounded.

24. A cleaning device according to claim 21 wherein said cleaning member is a roller having a cylindrical surface thereof arrange to abut against the recording surface, and wherein said drive means rotates said roller around a rotation axis thereof.

25. A cleaning device according to claim 21 wherein said means for moving said cleaning member relative to the recording surface includes a rotatable drive roller, and wherein the information recording medium is held between said cleaning member and said drive roller.

26. A cleaning device according to claim 21 wherein said hold means is integral with a main body of an information recording and reproducing apparatus.

27. A cleaning device according to claim 21 wherein said cleaning member is adapted to clean an information recording medium comprising a card-like optical information recording medium.

28. A cleaning device according to claim 27 wherein a direction of relative movement between the recording surface and said cleaning member is parallel to an information track on the information recording medium.

29. A cleaning device according to claim 21 further comprising a guide member arranged along a direction of relative movement between the recording surface and said hold means.

30. A cleaning device for cleaning a recording surface of an information recording medium, comprising:
   a cleaning member having a cleaning surface adapted to be abutted against the recording surface;
   hold means for holding said cleaning member;
   means for moving the recording surface relative to said hold means; and
   drive means for moving the cleaning surface of said cleaning member in a direction which forms an angle with an information track of the information recording medium.

31. A cleaning device according to claim 30, wherein said cleaning member is adapted to clean an information recording medium comprising a card-like optical information recording medium.

32. A cleaning device according to claim 31 wherein a direction of relative movement between the recording surface and said hold means is parallel to an information track on the information recording medium.

* * * * *

UNITED STATES PATENT AND TRADEMARK OFFICE
CERTIFICATE OF CORRECTION

PATENT NO. : 4,947,029

DATED : August 7, 1990

INVENTOR(S) : Hideo Kurihara, et al.

It is certified that error appears in the above-identified patent and that said Letters Patent is hereby corrected as shown below:

ON THE TITLE PAGE:

[30] FOREIGN APPLICATION PRIORITY DATA

"60-129175" should read --61-129175--.

[56] REFERENCES CITED

FOREIGN PATENT DOCUMENTS, "49-13635" should read --48-13635--.

[75] INVENTORS

"Yoshihiro Kurasawa," should read --Yoshihiro Kurosawa,--.

COLUMN 1:

Line 22, "magnetic..,." should read --magnetic--.

COLUMN 2:

Line 30, "and" should read --invention, and--.

Line 49, "pair with and on" should read --pairs with--.

Line 51, "pair with and on" should read --a pair with--.

COLUMN 3:

Line 1, "photo-sensors" should read --photo-sensor--.

UNITED STATES PATENT AND TRADEMARK OFFICE
CERTIFICATE OF CORRECTION

PATENT NO. : 4,947,029
DATED : August 7, 1990
INVENTOR(S) : Hideo Kurihara, et al.

It is certified that error appears in the above-identified patent and that said Letters Patent is hereby corrected as shown below:

Line 12, "contact" should read --contacts--.

COLUMN 4:

Line 7, "similar elements" should read --elements similar--.

Line 41, "to" should be deleted.

Line 44, "in" should read --on--.

Line 58, "plate 10" should read --plate 12--.

COLUMN 5:

Line 1, "groove 6a" should read --groove 14a--.

COLUMN 6:

Line 9, "gears 40 and 40a" should read --gears 30 and 30a--.

Line 23, "then" should read --than--.

Line 29, "ar" should read --are--.

Line 45, "to" should be deleted.

Line 47, "the" (second occurrence) should be deleted.

UNITED STATES PATENT AND TRADEMARK OFFICE
CERTIFICATE OF CORRECTION

PATENT NO. : 4,947,029
DATED : August 7, 1990
INVENTOR(S) : Hideo Kurihara, et al.

It is certified that error appears in the above-identified patent and that said Letters Patent is hereby corrected as shown below:

COLUMN 7:

Line 23, "clearing" should read --cleaning--.

Line 51, "surface;" should read --surface; and--.

Line 52, "and" should be deleted.

COLUMN 9:

Line 20, "cleaning member" (first occurrence) should read --hold means--.

Line 21, "hold means" should read --cleaning member--.

Line 35, "arrange" should read --arranged--.

Signed and Sealed this

Twenty-first Day of April, 1992

Attest:

HARRY F. MANBECK, JR.

*Attesting Officer*      *Commissioner of Patents and Trademarks*